United States Patent
Maric et al.

(10) Patent No.: US 11,885,965 B1
(45) Date of Patent: Jan. 30, 2024

(54) HEAD-MOUNTED DISPLAY AND DISPLAY MODULES THEREOF

(71) Applicants: Ivan S. Maric, Sunnyvale, CA (US); Jan K. Quijalvo, Mississauga (CA); Marinus Meursing, Sunnyvale, CA (US)

(72) Inventors: Ivan S. Maric, Sunnyvale, CA (US); Jan K. Quijalvo, Mississauga (CA); Marinus Meursing, Sunnyvale, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 17/011,354

(22) Filed: Sep. 3, 2020

Related U.S. Application Data

(60) Provisional application No. 62/904,207, filed on Sep. 23, 2019.

(51) Int. Cl.
*G02B 27/01* (2006.01)
*G02B 27/00* (2006.01)

(52) U.S. Cl.
CPC ..... *G02B 27/0172* (2013.01); *G02B 27/0093* (2013.01); *G02B 27/0101* (2013.01); *G02B 27/0176* (2013.01); *G02B 2027/0132* (2013.01)

(58) Field of Classification Search
CPC .............. G02B 27/017; G02B 27/0172; G02B 27/0093; G02B 27/0101; G02B 27/0176; G02B 2027/0132
See application file for complete search history.

(56) References Cited

U.S. PATENT DOCUMENTS

| 6,989,935 B2 | 1/2006 | Domjan et al. |
| 7,542,209 B2 | 6/2009 | McGuire, Jr. |
| 7,542,210 B2 | 6/2009 | Chirieleison, Sr. |

(Continued)

FOREIGN PATENT DOCUMENTS

| CN | 104317055 A | 1/2015 |
| CN | 105531716 A | 4/2016 |

(Continued)

OTHER PUBLICATIONS

International Search Report and Written Opinion dated Oct. 8, 2020, in co-pending Intl Application No. PCT/US2020/043677 (14 pp).

*Primary Examiner* — Nitin Patel
*Assistant Examiner* — Cory A Almeida
(74) *Attorney, Agent, or Firm* — Young Basile Hanlon & MacFarlane, P.C.

(57) ABSTRACT

A head-mounted display a housing, two display modules, and a head support. The two display modules are coupled to the housing. Each of the two display modules includes a display for outputting light that forms graphical content, a lens for refracting the light output by the display, and an eye illuminator. The eye illuminator includes a light-emitting diode, a flexible circuit to which the light-emitting diode is coupled, and a stiffener laminated to the flexible circuit with one or fewer layers of adhesive. The lens is removably coupled to the display indirectly by the stiffener. The head support is coupled to the housing for supporting the housing on a head of a user with the two display modules positioned to provide the graphical content to eyes of the user.

20 Claims, 7 Drawing Sheets

(56) References Cited

U.S. PATENT DOCUMENTS

| | | |
|---|---|---|
| 8,487,838 B2 | 7/2013 | Lewis et al. |
| 8,964,298 B2 | 2/2015 | Haddick et al. |
| 8,998,414 B2 | 4/2015 | Bohn |
| 9,880,441 B1 | 1/2018 | Osterhout |
| 10,073,268 B2 | 9/2018 | Alexander et al. |
| 10,203,489 B2 | 2/2019 | Khan et al. |
| 10,261,332 B1 | 4/2019 | Hebert |
| 10,598,942 B1 | 3/2020 | Richards et al. |
| 10,699,389 B2 | 6/2020 | Van der Auwera et al. |
| 2002/0167462 A1 | 11/2002 | Lewis et al. |
| 2008/0151184 A1 | 6/2008 | Spivey et al. |
| 2011/0026014 A1 | 2/2011 | Mack et al. |
| 2013/0077049 A1 | 3/2013 | Bohn |
| 2013/0161078 A1 | 6/2013 | Li |
| 2015/0243937 A1 | 8/2015 | Dinh et al. |
| 2016/0363995 A1 | 12/2016 | Rougeaux |
| 2017/0102546 A1 | 4/2017 | Tempel et al. |
| 2017/0102549 A1* | 4/2017 | Lee .................. G02B 27/0172 |
| 2017/0140224 A1 | 5/2017 | Wilson et al. |
| 2017/0246070 A1 | 8/2017 | Osterhout et al. |
| 2017/0262703 A1 | 9/2017 | Wilson et al. |
| 2017/0345136 A1 | 11/2017 | Van der Auwera et al. |
| 2017/0358136 A1 | 12/2017 | Gollier et al. |
| 2018/0039052 A1 | 2/2018 | Khan et al. |
| 2018/0101013 A1 | 4/2018 | Moore et al. |
| 2018/0113508 A1 | 4/2018 | Berkner-Cieslicki et al. |
| 2018/0157320 A1 | 6/2018 | Trail |
| 2018/0203505 A1* | 7/2018 | Trail .................. G02B 27/0093 |
| 2018/0217637 A1 | 8/2018 | Zou et al. |
| 2018/0231782 A1 | 8/2018 | Jung et al. |
| 2018/0239146 A1* | 8/2018 | Bierhuizen ........ G02B 27/0101 |
| 2018/0267320 A1 | 9/2018 | Chen et al. |
| 2019/0028697 A1 | 1/2019 | Sullivan et al. |
| 2019/0064525 A1* | 2/2019 | Mongoven ............... G01C 5/06 |
| 2019/0075689 A1 | 3/2019 | Selvakumar et al. |
| 2019/0111508 A1 | 4/2019 | Dabov et al. |
| 2020/0012101 A1 | 1/2020 | Yuki et al. |
| 2020/0174284 A1 | 6/2020 | Chan et al. |
| 2020/0249480 A1 | 8/2020 | Martinez et al. |
| 2021/0132384 A1 | 5/2021 | Liao et al. |

FOREIGN PATENT DOCUMENTS

| | | |
|---|---|---|
| CN | 105718046 A | 6/2016 |
| CN | 106796354 A | 5/2017 |
| CN | 107533231 A | 1/2018 |
| CN | 108474952 A | 8/2018 |
| CN | 108664118 A | 10/2018 |
| CN | 110168428 A | 8/2019 |
| JP | H06138369 A | 5/1994 |
| JP | 107185871 A | 7/1995 |
| JP | H07234375 A | 9/1995 |
| JP | 2010250211 A | 11/2010 |
| JP | 2015087525 A | 5/2015 |
| JP | 2015106915 A | 6/2015 |
| JP | 2018528628 A | 9/2018 |
| JP | 2018190825 A | 11/2018 |
| JP | 2019516204 A | 6/2019 |
| WO | 2016157485 A1 | 10/2016 |
| WO | 2017104018 A1 | 6/2017 |
| WO | 2018075949 A1 | 4/2018 |
| WO | 2018181144 A1 | 10/2018 |
| WO | 2018213010 A1 | 11/2018 |

* cited by examiner

HEAD-MOUNTED DISPLAY AND DISPLAY MODULES THEREOF

CROSS-REFERENCE TO RELATED APPLICATION(S)

This application claims priority to and the benefit of U.S. Provisional Application No. 62/904,207, filed Sep. 23, 2019, the disclosure of which is incorporated by reference herein in its entirety.

BACKGROUND

Head-mounted displays are display systems that are worn on a head of a user and which provide graphical content to the user. Mass of the head-mounted display and distribution thereof may lead to user discomfort or perceived weight by the user.

SUMMARY

In an implementation, a head-mounted display a housing, two display modules, and a head support. The two display modules are coupled to the housing. Each of the two display modules includes a display for outputting light that forms graphical content, a lens for refracting the light output by the display, and an illuminator. The illuminator includes a light-emitting diode, a flexible circuit to which the light-emitting diode is coupled, and a stiffener laminated to the flexible circuit with one or fewer layers of adhesive. The lens is removably coupled to the display indirectly by the stiffener. The head support is coupled to the housing for supporting the housing on a head of a user with the two display modules positioned to provide the graphical content to eyes of the user.

The flexible circuit may include a flexible base substrate and a conductive trace laminated to an upper surface of the flexible base substrate, while a bottom-most surface of the flexible base substrate may be coupled to a forward surface of the stiffener with a single layer of adhesive therebetween to laminate the flexible circuit to the stiffener.

Each of the display modules may further include a lens barrel to which the lens is coupled, while the lens barrel may be removably coupled to the stiffener with a mechanical fastener to removably couple the lens to the display. The stiffener may be a bezel stiffener that is coupled to the display with an adhesive layer coupled to a rear surface of the display and a forward surface of the bezel stiffener.

The stiffener may be a barrel stiffener to which the lens is coupled. Each of the display modules may further include a display bezel that is coupled the display with an adhesive layer, while the barrel stiffener may be removably coupleable to the display bezel with a mechanical fastener to removably couple the lens to the display.

In an implementation, a display module for a head-mounted display includes a display, a lens, and an illuminator. The display is for outputting light that forms graphical content. The lens is for refracting the light output by the display. The illuminator includes a light-emitting diode, a flexible circuit to which the light-emitting diode is coupled, and a stiffener laminated to the flexible circuit with one or fewer layers of adhesive. The lens is removably coupled to the display indirectly by the stiffener.

A display module for a head-mounted display includes a display, a lens, an eye sensor, and an illuminator. The display outputs light as graphical content. The lens is coupled to the display and that refracts the light output by the display. The illuminator is for illuminating an eye of a user of the head-mounted display for the eye sensor to observe the eye. The illuminator includes a flexible circuit, a light-emitting diode coupled to an upper surface of the flexible circuit, and a stiffener coupled to a bottom-most surface of the flexible circuit with one or fewer layers of adhesive. The display module has a lens stack that extends from a rear surface of the display to the lens and that includes the stiffener of the illuminator.

DETAILED DESCRIPTION

Described herein are head-mounted displays and display modules thereof. The display modules provide graphical content to the user, while also monitoring the eye of the user, such as for eye tracking or user identification purposes. The graphical content may be associated with computer-generated reality discussed below). To monitor the eye of the user, the display module includes a sensor (e.g., a camera) and an illuminator that illuminates the eye with (e.g., with infrared light) that is detected by the sensor. Various embodiments of the display module are disclosed herein, which have mass that is reduced and/or shifted relative to each other to provide the user greater comfort while wearing the head-mounted display.

Figure 1A:
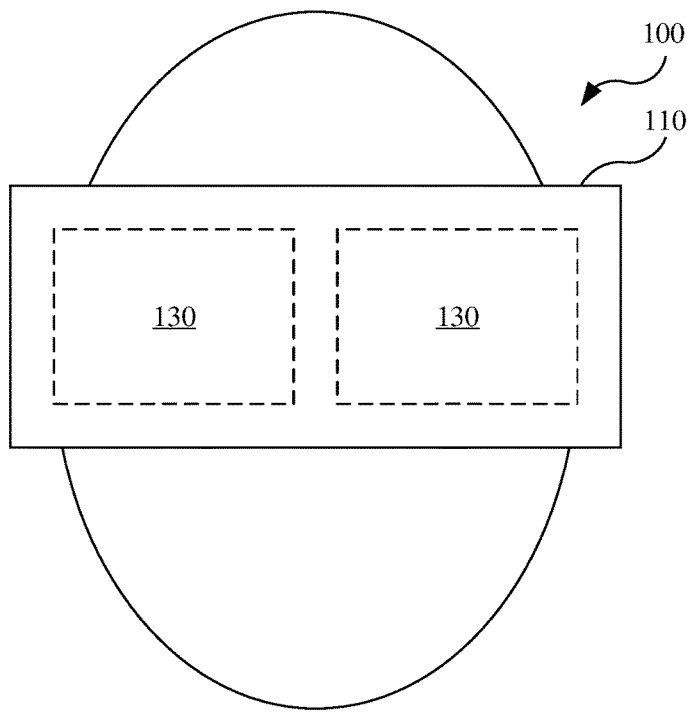
FIG. 1A is a front view of a head-mounted display on a head of a user.
Figure 1B:
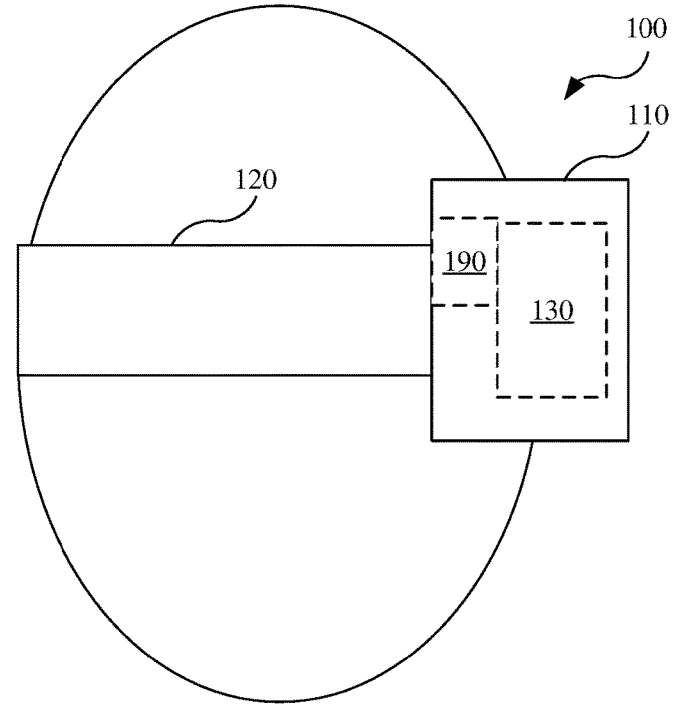
FIG. 1B is a side view of the head-mounted display on the head of the user.

Referring to FIGS. 1A and 1B, a head-mounted display 100 generally includes a housing 110, a support 120, and two display modules 130. The head-mounted display 100 is configured to be worn on a head of a user with the display modules 130 in suitable position for displaying graphical content to the eyes of the user. The housing 110 functions as a chassis that supports the two display modules 130 and may engage the face of a user. For example, the housing 110 may further include a facial interface (e.g., a light seal) that is compliant to distribute force over the face of the user and that blocks ambient light from reaching eyes of the user.

The support 120 is coupled to the housing 110 and functions to support the housing 110 on the head of the user and, thereby, the display modules 130 relative to the user. The support 120 may, as shown, be configured as a strap that wraps around the head of the user, which may be flexible and elastic or otherwise adjustable in length to accommodate different shapes and sizes of users' heads. The head support 120 may be configured in other manners, for example, by extending over top of the head of the user and/or extending only partially around the head of the user.

Each of the two display modules 130 is associated with one of the eyes of the user and provides graphical content thereto. Each of the two display modules 130 also observes the eye associated therewith. The display modules 130 and variations thereof are discussed in further detail below.

The head-mounted display 100 may also include a suitable controller 190 that operates the display modules 130, including displaying of the graphical content therewith and/or observing the eyes. The controller 190 may, for example, include a processor, a memory (e.g., volatile high-speed memory, such as a random access memory module), a storage (e.g., a non-volatile storage device, such as a solid state drive), a communications interface (e.g., for sending and/or receiving signals to/from other components or devices, such as the display modules 130 and components thereof), and a bus by which the processor, the memory, the storage, and the communications interface are in communication. The controller (e.g., the processor thereof) operates the various electronic components of the head-mounted display 100 according to instructions (e.g., software code stored by the storage). While shown as being in the housing 110, the controller 190 may instead be positioned remotely therefrom (e.g., in wired or wireless communication with other components of the head-mounted display 100).

Referring to FIGS. 2 and 3A-3C, the display module 130 includes a display 240, a lens 250, and a lens barrel 260. The display module 130 also includes an eye sensor 270 and an eye illuminator 280 that are cooperatively configured for monitoring the eye of the user, such as by being operated by the controller 190.

The display 240 may be any suitable type of display panel for outputting the graphical content to the eye of the user. For example, the display 240 may be a micro light-emitting diode display (micro LED), organic light-emitting diode display (OLED), liquid crystal display (LCD), or other suitable type of display. The display 240 is depicted in a simplified manner but should be understood to include appropriate components depending on the type of aforementioned display, such as a substrate (e.g., circuit board), electronic components (e.g., LEDs), and/or optical components (e.g., one or more layers of protective glass, filters, and/or polarizers). The display 240 has a suitable resolution (e.g., 4K, higher, or lower) and aspect ratio (e.g., 16×9, taller, or shorter). As is shown, the display 240 has a rectangular shape (e.g., having a periphery that is substantially rectangular), but may have any other suitable shape.

The lens 250 refracts light emitted by the display 240, which forms the graphical content, before reaching the eye of the user. The lens 250 may, for example, be a catadioptric lens. The lens 250 may have a rectangular shape as shown, or any other suitable shape (e.g., oval, circular, or irregular, such as being taller and wider at upper and lower ends thereof).

The lens barrel 260 couples the lens 250 to the display 240 in suitable position for properly refracting the light emitted by the display 240 for the graphical content to be viewed by the user. The lens barrel 260 is a generally tubular structure that circumscribes an optical axis of the display module 130, the optical axis extending generally perpendicular to the display 240 and through a center of the lens 250. The forward end (e.g., an outward or distal end) of the lens barrel 260 is coupled to the display 240, while the rearward end (e.g., an inward or proximal end) of the lens barrel 260 is coupled to the lens 250 directly or indirectly. As discussed in further detail below, the lens barrel 260 and variations thereof may be coupled to the display 240 in various different manners. As shown, the lens 250 may be received inside the lens barrel 260 to be couple thereto, but any other suitable spatial and/or coupling arrangement may be used, such as with the lens 250 being positioned outside the lens barrel 260 and/or with various intervening lens coupling components. As used herein the directional terms of "forward" and "rearward," or variations thereof (e.g., front and rear), generally refer to the directions, respectively, in which the user is facing and that face toward the user. Accordingly, a forward end or surface of a component will generally be positioned further from the user, and a rearward end or surface of the component will generally be positioned closer to the user.

The lens barrel 260 may have a generally rectangular cross-sectional shape with rounded corners (as shown), but may have any other suitable (e.g., circular, oval, or irregular) and/or change moving in an axial direction (e.g., generally conforming to the rectangular shape of the display 240 at a forward end and a rounded shape of the lens 250 at a rear end). The lens barrel 260 may be a unitary structure or formed of multiple components that are coupled together. The lens barrel 260 and its subcomponents may be made of any suitable material (e.g., polymer, aluminum, steel).

The display 240, the lens 250, and the lens barrel 260 cooperatively define a chamber 332 of the display module 130. The lens barrel 260 may also be opaque, so as to prevent external light from entering into the chamber 332. The chamber 332 may be sealed, so as to prevent air, debris, and moisture from entering into the chamber 332. Alternatively, the chamber 332 may be in fluidic communication with the environment, such as through a vent and/or a valve that prevent debris, moisture, or other contaminants from entering the chamber 332.

The eye sensor 270 and the eye illuminator 280 are positioned in the chamber 332 of the display module 130. The eye illuminator 280 emits light that is reflected and/or refracted by the eye of the user, which is detected by the eye sensor 270 for observing the eye.

The eye sensor 270 may, for example, be a camera (e.g., an RGB and infrared ("IR") camera, or a dedicated IR camera) or other light-sensitive type of sensor (e.g., an ambient light sensor ("ALS")). The eye sensor 270 is positioned inside the chamber 332, such as by being coupled to the lens barrel 260. As shown, with the display module 130 being for a left eye of the user, the eye sensor 270 is positioned laterally on an inner side (e.g., nose side) of the display module 130 and vertically at an approximate midpoint between upper and lower sides thereof (e.g., of the chamber 332 or the display 240). The eye sensor 270 may, however, be positioned at other locations, such as being laterally positioned on an outer side (e.g., temporal side) of the display module 130 and/or being vertically positioned higher or lower. Notably, a lower outer position may be advantageous, as fewer facial structures (e.g., brows and/or nose) are present, thereby providing more space in which the eye sensor 270 may be positioned).

The eye illuminator 280 emits light that is reflected and/or refracted by the eye for observation by the eye sensor 270. The eye illuminator 280 emits light of a wavelength at which the eye sensor 270 is sensitive but which may not be visible to the user, such as in the infrared spectrum. The eye illuminator 280 includes, for example, one or more light-emitting diodes 282 (e.g., infrared light-emitting diodes) and a flexible circuit 384 to which the light-emitting diodes 282 are coupled. The eye illuminator 280 may also include a cover or diffuser (not shown) positioned over and/or rearward of the light-emitting diodes 282. As is shown, the eye illuminator 280 is ring-shaped with multiple light-emitting diodes 282 (e.g., ten as shown) that surround the optical axis and are arranged near an inner periphery of the lens barrel 260. While shown as extending generally uniformly around the optical axis (e.g., with the light-emitting diodes 282 being spaced apart from each other and from the lens barrel 260 generally equal distances), other configurations are contemplated. For example, the eye illuminator 280 may have different geometric arrangements, such as with the flexible circuit 384 and/or the light-emitting diodes 282 extending partly (not wholly) around the optical axis, by the light-emitting diodes 282 being spaced irregularly from each other or the lens barrel 260, and/or by being positioned or concentrated in specific areas (e.g., for specific uses, such as eye tracking and/or user identification).

Figure 3A:
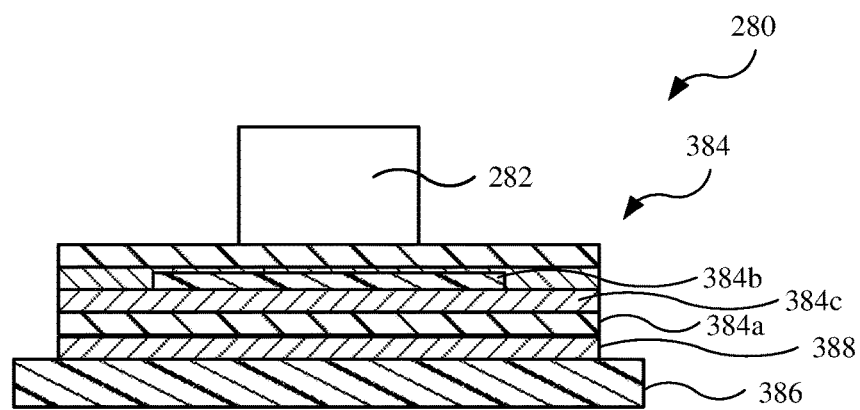
FIG. 3A is a cross-sectional view of an illuminator of the display module taken along line 3A-3A in FIG. 2.

Referring to the partial cross-sectional view of FIG. 3A, the flexible circuit 384 of the eye illuminator 280 generally includes a flexible base substrate 384a and a base conductive layer 384b on the flexible base substrate 384a, as is understood in the art of flexible circuits. The flexible base substrate 384a a is a continuous sheet of a polyimide or other suitable material of appropriate thickness, such as 50 microns, more (e.g., 75 or 100 microns) or less (e.g., 12.5 or 25 microns). The base conductive layer 384b is coupled to the flexible base substrate 384a and forms conductive traces thereon for conducting electricity to the light-emitting diodes 282 for operation thereof. The base conductive layer 384b is, for example, a copper sheet that is laminated to an upper surface of the flexible base substrate 384a with an adhesive layer 384c therebetween. The conductive traces may be formed by removing portions of the base conductive layer 384b, such that the remaining material of the base conductive layer 384b forms the conductive traces (e.g., with etching, such as photochemical etching). One or more further adhesive layers (shown but not labeled), flexible substrate layers (shown but not labeled), and further conductive layers (not shown) may be coupled to the top surface of the flexible base substrate 384a and the base conductive layer 384b, which may cover the base conductive layer 384b and/or form additional conductive traces. For clarity, it should be understood that the flexible base substrate 384a and base conductive layer 384b are the bottom-most of such layers of the flexible substrate and the conductive layer of the flexible circuit 384, which may form the forward-most layers of the flexible circuit 384 when provided in the display module 130 as illustrated in the figures and discussed below.

Figure 3B:
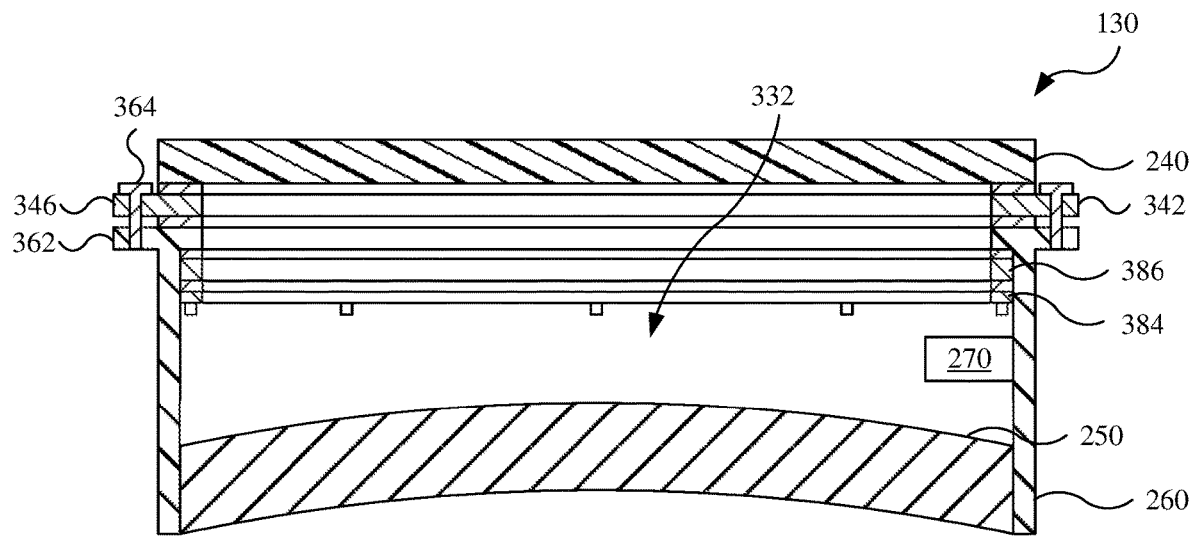
FIG. 3B is a cross-sectional view of a first embodiment of the display module taken along line 3B-3B in FIG. 2.
Figure 3C:
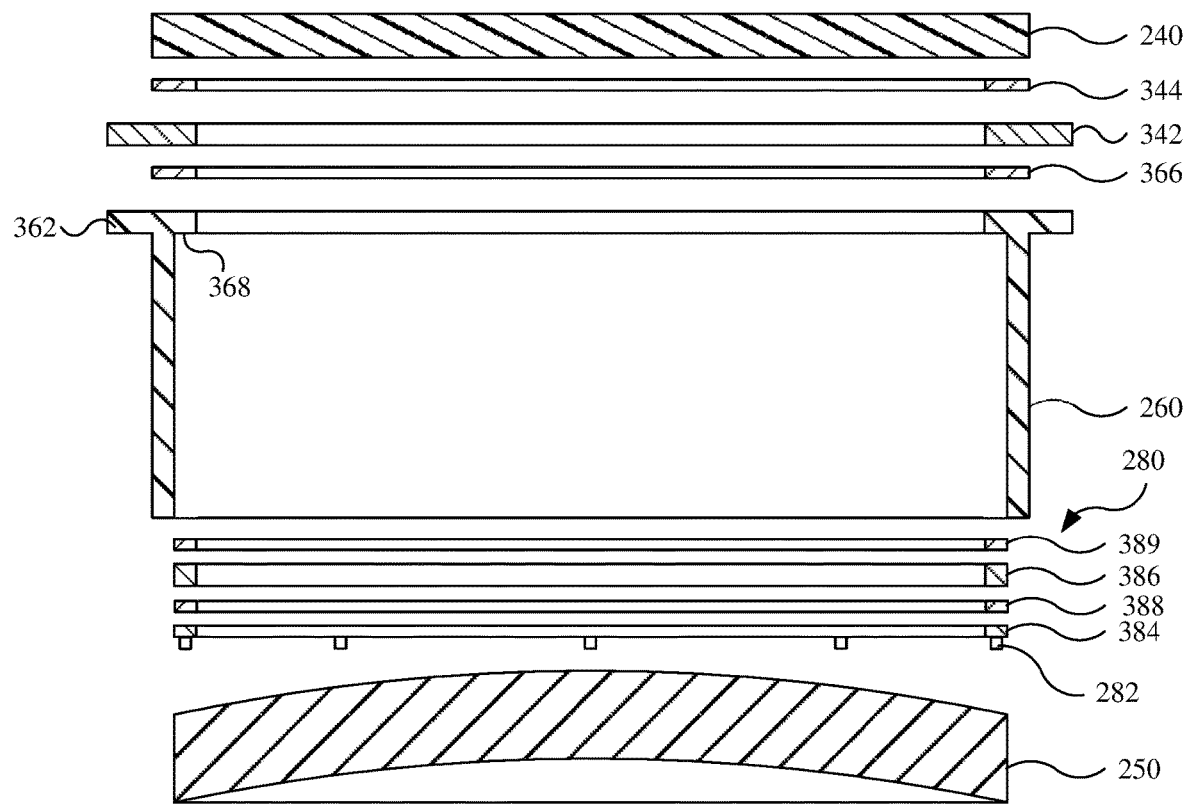
FIG. 3C is an exploded cross-sectional view of the display module of FIG. 3A.

Referring additionally to FIGS. 3B and 3C, the eye illuminator 280 additionally includes a stiffener 386 that is a structural member coupled to the flexible circuit 384 to provide support thereto. More particularly, the stiffener 386 is coupled to the bottom surface of the flexible base substrate 384a of the flexible circuit 384 with an adhesive layer 388. As shown, the stiffener 386 may be of uniform thickness (e.g., being formed from a sheet of polyimide) and take the shape of the flexible circuit 384 (e.g., being generally ring-shaped and circumscribing the optical axis), but may be formed of other materials and have different shapes (e.g., as discussed with a bezel stiffener 586 and a barrel stiffener 686 below). To differentiate the stiffener 386 and variations thereof discussed below (e.g., the bezel stiffener 586 and the barrel stiffener 686) from other rigid components to which the flexible circuit 384 might be indirectly coupled, a stiffener (e.g., the stiffener 386, the bezel stiffener 586, and the barrel stiffener 686) is defined as a structural component to which the flexible circuit 384 is laminated (a) with one or fewer adhesive layers therebetween, (b) by the manufacturer of the flexible circuit 384, or (c) both with (a) and by (b). Laminated refers to the coupling of two mating surfaces of two components to each other substantially continuously at locations where the two mating surfaces overlap and with the one or fewer adhesive layers contacting the two mating surfaces. The mating surface of the flexible circuit 384 is the bottom-most surface of the flexible base substrate 384a as described previously, which may form the forward-most surface when provided in the display module 130. For example, the flexible circuit 384 may be laminated to the stiffener 386 by the manufacturer of the flexible circuit 384, such as by thermally bonding the bottom-most surface of the flexible base substrate 384a to the mating surface of the stiffener with a thermosetting adhesive layer 388 (e.g., an acrylic adhesive).

The light-emitting diodes 282 are in turn mechanically and electrically coupled to the flexible circuit 384, such as with surface-mount technology (SMT) to an upper surface of the flexible circuit 384. The conductive traces of the flexible circuit 384 conduct electrical power to the light-emitting diodes 282 for operation thereof as operated, for example, by the controller 190.

Figure 2:
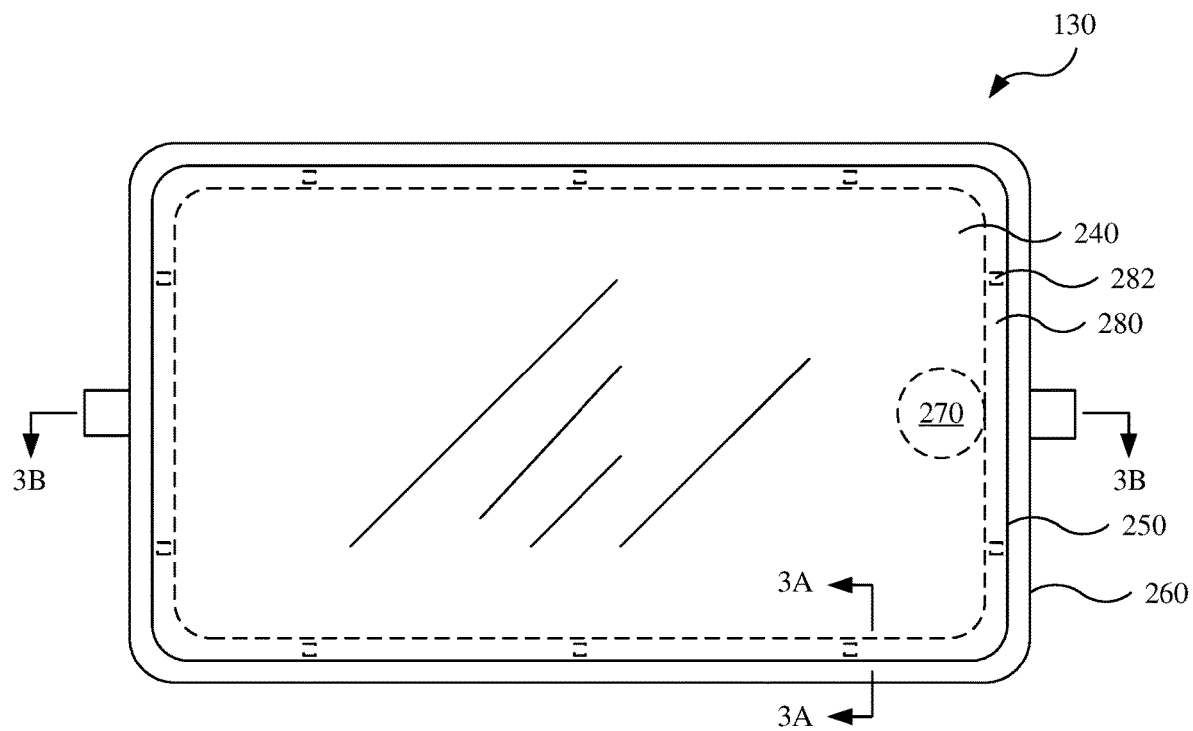
FIG. 2 is a front view of a display module of the head-mounted display.

Referring still to FIGS. 2-3C and additionally to FIGS. 4A-6B, as referenced above and discussed in further detail below, the components of the display module 130 (e.g., the display 240, the lens 250, the lens barrel 260, the eye illuminator 280, and subcomponents thereof) may be manufactured and coupled to each other in various manners that may provide various manufacturing and/or packaging advantages. For example, the display module 130 and variations thereof (e.g., the display modules 430, 530, 630) may be considered to have a lens stack and an illuminator stack. The lens stack includes, and may further consist of, those components that are coupled to or otherwise engage each other to support the lens 250 relative to the display 240 and which extend from a rear surface of the display 240 to and including the lens 250. A lens stack height is the distance measured perpendicular from the rear surface of the display 240 to the rearmost surface of the lens 250. The illuminator stack includes, and may further consist of, those components that are coupled to or otherwise engage each other to support the light-emitting diodes 282 of the eye illuminator 280 relative to the display 240, which extend from a rear surface of the display 240 to and including the light-emitting diodes 282. An illuminator stack height is measured perpendicular from the rear surface of the display 240 to a rearmost surface the light-emitting diodes 282. By reducing components in the lens stack and/or the illuminator stack and/or by reducing the lens stack height and/or the illuminator stack height, mass may be reduced from the display module, the center of gravity may be shifted (e.g., which the user may perceive as reduced mass), and/or the display module may be made more compact.

As shown in the cross-sectional and exploded cross-sectional views of FIGS. 3B-3C, the display module 130 further includes a display bezel 342 by which the lens barrel 260 is coupled to the display 240, and each of the lens 250, the eye sensor 270, and the eye illuminator 280 are in turn coupled to the display 240 by way of the lens barrel 260.

The display bezel 342 circumscribes the optical axis and includes a central aperture (not labeled) through which the display 240 is visible by the user. The display bezel 342 is coupled to the display 240 at an outer periphery of a rear surface the display 240, for example, on a rear surface thereof with an adhesive layer 344, such as a pressure sensitive adhesive ("PSA") of suitable type. The display bezel 342 further includes coupling portions 346 by which the display bezel 342 and, thereby, the display 240 are coupled to the lens barrel 260. As shown, the coupling portions 346 may be configured as outwardly-extending flanges but may be instead configured in other manners by which the lens barrel 260 is removably or irremovably coupled to the display bezel 342. The display bezel 342 may be formed of a polymer, metal, or any other suitable material. The display bezel 342 may be a unitary structure or formed of multiple components coupled together.

The lens barrel 260 is coupled to the display bezel 342 at the forward end thereof and to the lens 250 at a rearward end thereof. The lens barrel 260 includes coupling portions 362 (e.g., flanges) that correspond to the coupling portions 346 of the display bezel 342, which are configured to receive a mechanical fastener 364 (e.g., a screw) for removably coupling the lens barrel 260 to the display bezel 342 and, thereby, the lens 250 to the display 240. A seal 366, such as a rubber, foam, or other seal member, is arranged between a rear surface of the display bezel 342 and a forward surface of the forward end of the lens barrel 260. The seal 366 is compressed by the mechanical fasteners 364 between the display bezel 342 and the lens barrel 260. While two sets of coupling portions 346, coupling portions 362, and mechanical fasteners 364 are illustrated, it should be understood that more, fewer, and/or different types of mechanical couplings may be provided. For example, the coupling portions 346, 362 may instead protrude inward relative to the display 240 and/or the lens barrel 260. Advantageously, the use of the mechanical fasteners 364, or other types of mechanical couplings, may allow for the display 240 to be removed other portions of the display module 130 to allow for repair or replacement thereof, for example, if the display 240, the eye sensor 270, or the eye illuminator 280 require repair or replacement. Alternatively, the lens barrel 260 and variations thereof (e.g., the lens barrel 460 and the barrel stiffener 660 described below) may instead be coupled to the display bezel 342 and variations thereof with an adhesive layer (e.g., replacing the seal 366), such as a pressure sensitive adhesive.

The lens barrel 260 is in turn coupled to the eye sensor 270 and the eye illuminator 280. The eye sensor 270 is positioned within the chamber 332, for example, being coupled to an inner portion of the lens barrel 260 (e.g., a surface, receptacle, or other feature), such as with a mechanical fastener and/or adhesive (not shown).

The eye illuminator 280 is positioned within the chamber 332, for example, being coupled to an inner coupling portion 368 of the lens barrel 260. The inner coupling portion 368 forms a rearward-facing surface that partially or wholly circumscribes the optical axis. For example, as shown, the inner coupling portion 368 is an inwardly-protruding flange. The eye illuminator 280 is coupled to the inner coupling portion 368 of the lens barrel 260 with an adhesive layer 389, such as the pressure sensitive adhesive, being arranged between (e.g., being coupled directly to each of) the inner coupling portion 368 of the lens barrel 260 and the stiffener 386 of the eye illuminator 280.

The lens stack of the display module 130 includes the adhesive layer 344, the display bezel 342, the seal 366, the coupling portion 362 of the lens barrel 260, the lens barrel 260 itself, the lens 250, and may further include any components by which the lens 250 is coupled to the lens barrel 260. The lens stack height includes the non-overlapping perpendicular dimensions (i.e., measured relative to the display 240) of the adhesive layer 344, the display bezel 342, the seal 366, the coupling portion 362 of the lens barrel 260, the lens barrel 260 itself, and any portion of the lens 250 or coupling components thereof that are rearward of the lens barrel 260. The eye illuminator 280 (i.e., adhesive layer 388, the stiffener 386, the flexible circuit 384, and the light-emitting diodes 282) and the adhesive layer 389 are not part of the lens stack of the display module 130.

The illuminator stack of the display module 130 includes, and may further consist of, the adhesive layer 344, the display bezel 342, the seal 366, the inner coupling portion 368 of the lens barrel 260, the adhesive layer 389, and the eye illuminator 280 itself (i.e., the stiffener 386, the adhesive layer 388, the flexible circuit 384, and the light-emitting diodes 282). The illuminator stack height includes, and may further consist of, the non-overlapping perpendicular dimensions (i.e., measured relative to the display 240) of the adhesive layer 344, the display bezel 342, the seal 366, the inner coupling portion 368 of the lens barrel 260, the adhesive layer 389, and the eye illuminator 280 itself (i.e., the stiffener 386, the adhesive layer 388, the flexible circuit 384, and the light-emitting diodes 282).

Figure 4A:
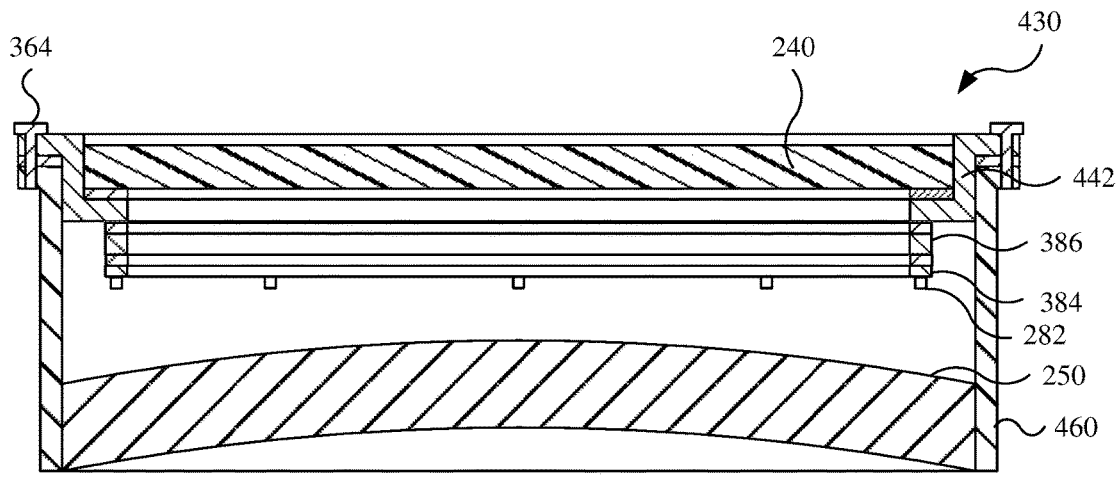
FIG. 4A is a cross-sectional view of a second embodiment of the display module taken along line 3-3 in FIG. 2.
Figure 4B:
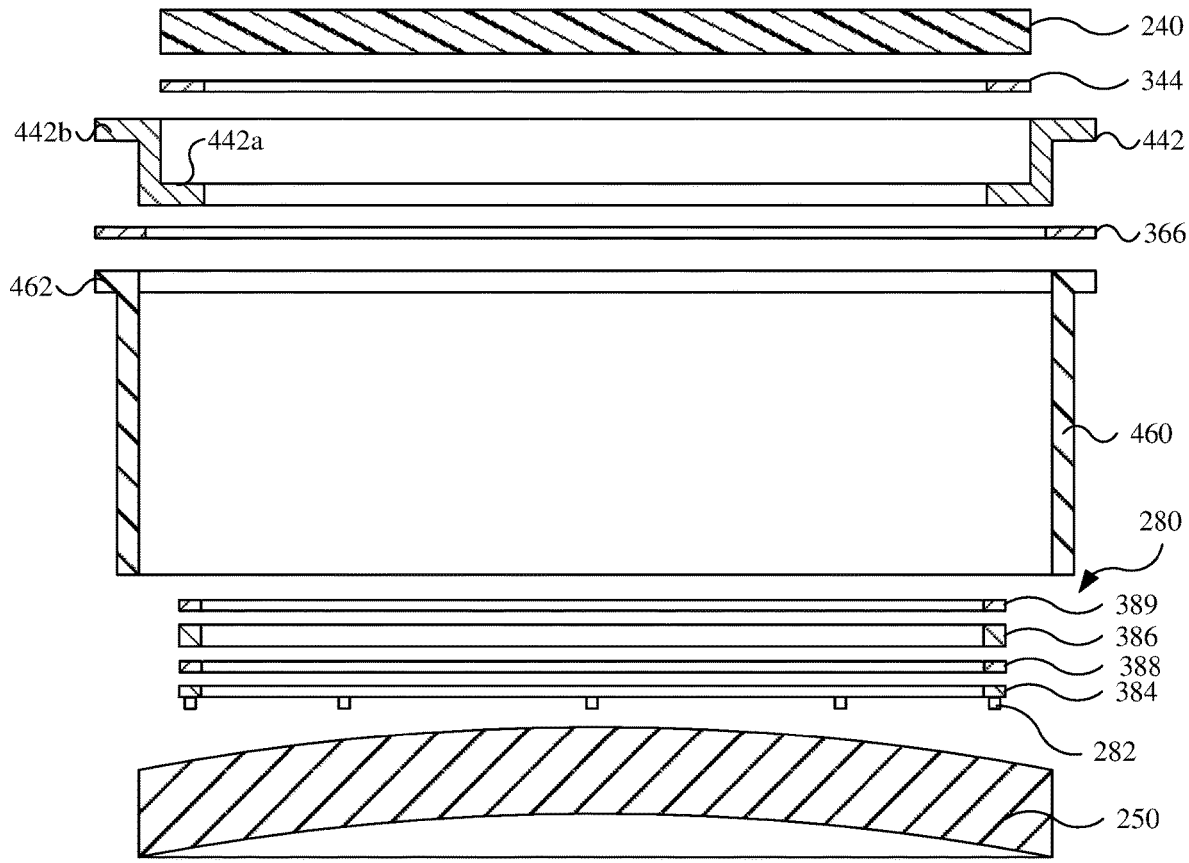
FIG. 4B is an exploded cross-sectional view of the display module of FIG. 4A.

As shown in FIGS. 4A and 4B, a display module 430 is a variation of the display module 130. The display module 430 includes the display 240, the lens 250, the eye sensor 270, and the eye illuminator 280 as described previously. The display module 430 also includes a display bezel 442 and a lens barrel 460 that are variations of the display bezel 342 and the lens barrel 260 described previously.

The display bezel 442 is shaped differently from the display bezel 342 but may otherwise be comparably formed. The display bezel 442, as compared to the display bezel 342, extends radially outward from the display 240. The display bezel 442, thus, may be considered to include an inner coupling portion 442a (e.g., an inner flange) that radially overlaps and is coupled to the display 240 and an outer coupling portion 442b (e.g., an outer flange) that extends radially outward thereof and to which the lens barrel 460 is coupled. A forward surface of the inner coupling portion 442a of the display bezel 442 is coupled to the periphery of the rearward surface of the display 240 with the adhesive layer 344.

An outer coupling portion 462 at the forward end of the lens barrel 460 is coupled to the outer coupling portion 442b of the display bezel 442. For example, as shown, the mechanical fasteners 364 (e.g., screws) couple the outer coupling portion 442b of the display bezel 442 to the outer coupling portion 462 of the lens barrel 460 with the seal 366 being positioned therebetween.

The outer coupling portion 442b of the display bezel 442 may also protrude forward (i.e., away from the lens 250), thereby defining a recess in which the display 240 is positioned. As a result, rear surfaces of the inner coupling portion 442a and the outer coupling portion 442b of the display bezel are offset by a distance in the axial direction, which is referred to herein as an axial offset. As a result, the forward end of the lens barrel 460 overlaps a portion of the display 240 in a forward direction. The seal 366 may also overlap a portion of the display 240 in the forward direction (as shown) or be positioned entirely forward thereof.

The lens 250 is coupled to a rear end of the lens barrel 460 in any of the manners described previously with the lens barrel 260.

The eye illuminator 280 is coupled to a rear surface of the inner coupling portion 442a of the display bezel 442 with the adhesive layer 388.

As a result, the lens stack of the display module 430 includes the adhesive layer 344, the inner coupling portion 442a of the display bezel 442, the seal 366, the lens barrel 460, the lens 250, and any components by which the lens 250 is coupled to the lens barrel 460. The lens stack height includes the non-overlapping perpendicular dimensions (i.e., measured relative to the display 240) of the adhesive layer 344, the inner coupling portion 442a of the display bezel 442, the seal 366, the outer coupling portion 462 of the lens barrel 460, the lens barrel 460 itself, and any portion of the lens 250 or coupling components thereof that are rearward of the lens barrel 260, less the axial offset between the rear surfaces of the inner coupling portion 442a and the outer coupling portion 442b of the display bezel 442. As compared to the lens stack height of the display module 130, the lens stack height of the display module 430 is reduced by the axial offset of the display bezel 442.

Also as a result, the illuminator stack of the display module 430 includes, and may further consist of, the adhesive layer 344, the inner coupling portion 442a of the display bezel 442, the adhesive layer 389, and the eye illuminator 280 (i.e., the stiffener 386, the adhesive layer 388, the flexible circuit 384, and the light-emitting diode 282). The illuminator stack height of the display module 430 includes, and may further consist of, the non-overlapping perpendicular dimensions (i.e., measured relative to the display 240) of the adhesive layer 344, the inner coupling portion 442a of the display bezel 442, the adhesive layer 389, and the eye illuminator 280 (i.e., the stiffener 386, the adhesive layer 388, the flexible circuit 384, and the light-emitting diode 282). As compared to the display module 130, the illuminator stack of the display module 430 omits the seal 366 and the inner coupling portion 368 of the lens barrel 260, and the illuminator stack height of the display module 430 is reduced by the perpendicular dimensions (e.g., the thicknesses) of the seal 366 and the inner coupling portion 368 of the lens barrel 260.

Figure 5A:
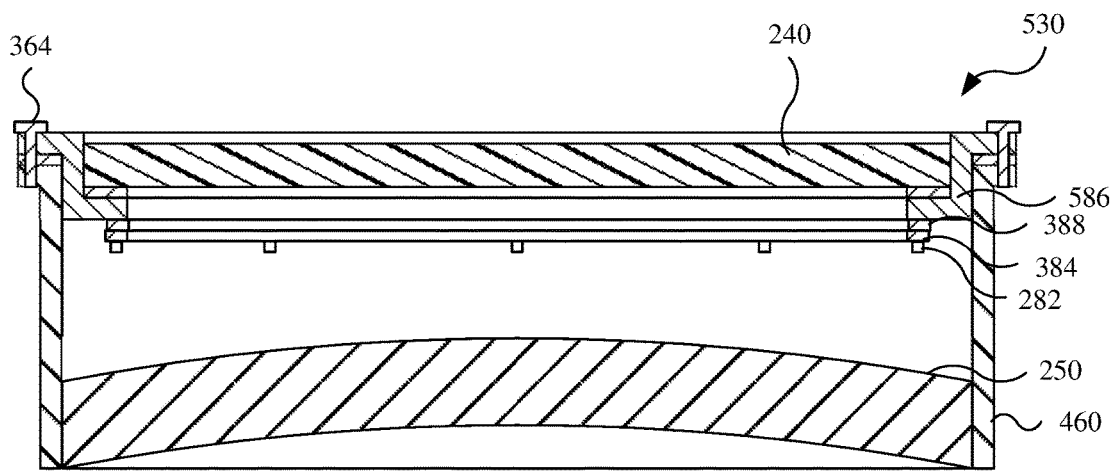
FIG. 5A is a cross-sectional view of a first embodiment of the display module taken along line 3B-3B in FIG. 2.
Figure 5B:
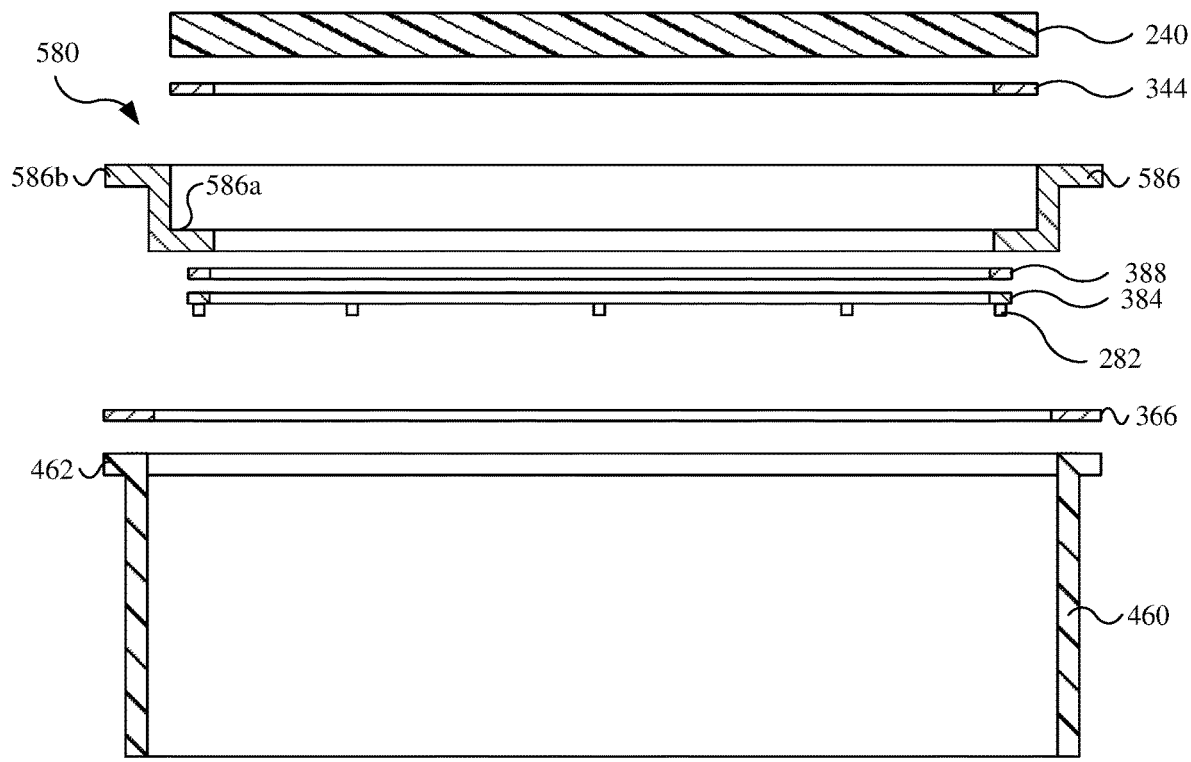
FIG. 5B is an exploded cross-sectional view of the display module of FIG. 5A.

As shown in the detail view of FIGS. 5A and 5B, a display module 530 is a variation of the display modules 130, 430. The display module 530 includes the display 240, the lens 250, the eye sensor 270, and the lens barrel 460. The display module 530 also includes an eye illuminator 580 that is a variation of the eye illuminator 280 described previously.

Rather than the display module 530 including both the display bezel 442 and the stiffener 386, the eye illuminator 580 instead includes a bezel stiffener 586 that functions as both the stiffener 386 and the display bezel 442.

The bezel stiffener 586 may be configured substantially as described above for the display bezel 442, for example, being shaped and formed similarly to include an inner coupling portion 586a and an outer coupling portion 586b with an axial offset (e.g., as described above for the inner coupling portion 442a and the outer coupling portion 442b of the display bezel 442). However, the bezel stiffener 586 is instead considered to be a stiffener for the flexible circuit 384, because the bottom-most surface of the flexible base substrate 384a is laminated thereto with one or fewer layers of adhesive and/or by the manufacturer of the flexible circuit 384. More particularly, a rear surface of the inner coupling portion 586a of the bezel stiffener 586 is coupled to the bottom-most surface of the flexible base substrate 384a of the flexible circuit 384 with the adhesive layer 388, such as being thermally bonded thereto with an acrylic adhesive. The illuminator 580 may be supplied as a subassembly that is later coupled to other components of the display module 530 (e.g., to the display 240).

The bezel stiffener 586 also functions as the display bezel 442 by being coupled to the display 240 and forming the intermediate structure by which the lens 250 and lens barrel 460 are indirectly coupled to the display 240. A forward surface of the inner coupling portion 586a of the bezel stiffener 586 is coupled to the periphery of the rearward surface of the display 240 with the adhesive layer 344 (e.g., the pressure sensitive adhesive). The outer coupling portion 586b of the bezel stiffener 586 is coupled to the lens barrel 460 as described previously with the mechanical fasteners 364 and the seal 366 arranged therebetween. By extending between and being coupled to the display 240 and the lens barrel 460, the bezel stiffener 586 functions similar to the display bezel 442. With the bezel stiffener 586 being coupled to the display 240 with the adhesive layer 344 and the lens barrel 460 in turn coupled to the bezel stiffener 586 with the mechanical fasteners 364, the lens 250 and the lens barrel 460 are each considered to be indirectly removably coupled to the display 240 indirectly by a stiffener of the illuminator 580 (i.e. by the bezel stiffener 586).

As a result of the bezel stiffener 586 replacing the display bezel 442, the lens stack of the display module 530 includes the adhesive layer 344, the bezel stiffener 586, the seal 366, the outer coupling portion 462 of the lens barrel 460, the lens barrel 460 itself, the lens 250, and may further include any components by which the lens 250 is coupled to the lens barrel 460. The lens stack height includes the non-overlapping perpendicular dimensions (i.e., measured relative to the display 240) of the inner coupling portion 586a of the bezel stiffener 586, the seal 366, the outer coupling portion 462 of the lens barrel 460, the lens barrel 460 itself, and any portion of the lens 250 or coupling components thereof that are rearward of the lens barrel 260, less the axial offset between the rear surfaces of the inner coupling portion 586a and the outer coupling portion 586b of the bezel stiffener 586. Thus, as compared to the lens stack height of the display module 130, the lens stack height of the display module 530 is reduced by the axial offset of the bezel stiffener 586.

As a result of the bezel stiffener 586 replacing both the display bezel 442 and the stiffener 386, the illuminator stack height of the display module 530 is reduced as compared to the display modules 130, 430. The illuminator stack of the display module 530 includes, and may further consist of, the adhesive layer 344, the inner coupling portion 586a of the bezel stiffener 586 (e.g., similar to the display bezel 442), the adhesive layer 388, the flexible circuit 384, and the light-emitting diodes 282. The illuminator stack height includes, and may further consist of, the non-overlapping perpendicular dimensions (i.e., measured relative to the display 240) of the adhesive layer 344, the inner coupling portion 586a of the bezel stiffener 586 (e.g., similar to the display bezel 442), the adhesive layer 388, the flexible circuit 384, and the light-emitting diodes 282. Thus, as compared to the display module 430, the illuminator stack of the display module 530 omits the adhesive layer 389 and the stiffener 386, while the illuminator stack height is reduced by the perpendicular dimensions (e.g., the thicknesses of) of the adhesive layer 389 and the stiffener 386. Furthermore, the mass of the display module 530 is reduced as compared to the display module 430 by omitting the adhesive layer 389 and the stiffener 386.

Figure 6A:
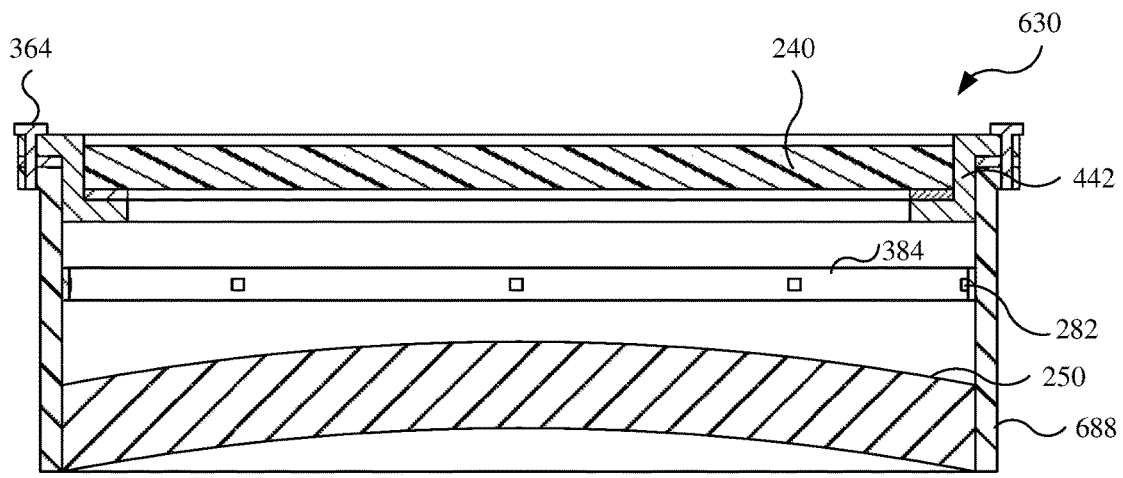
FIG. 6A is a cross-sectional view of a first embodiment of the display module taken along line 3B-3B in FIG. 2.
Figure 6B:
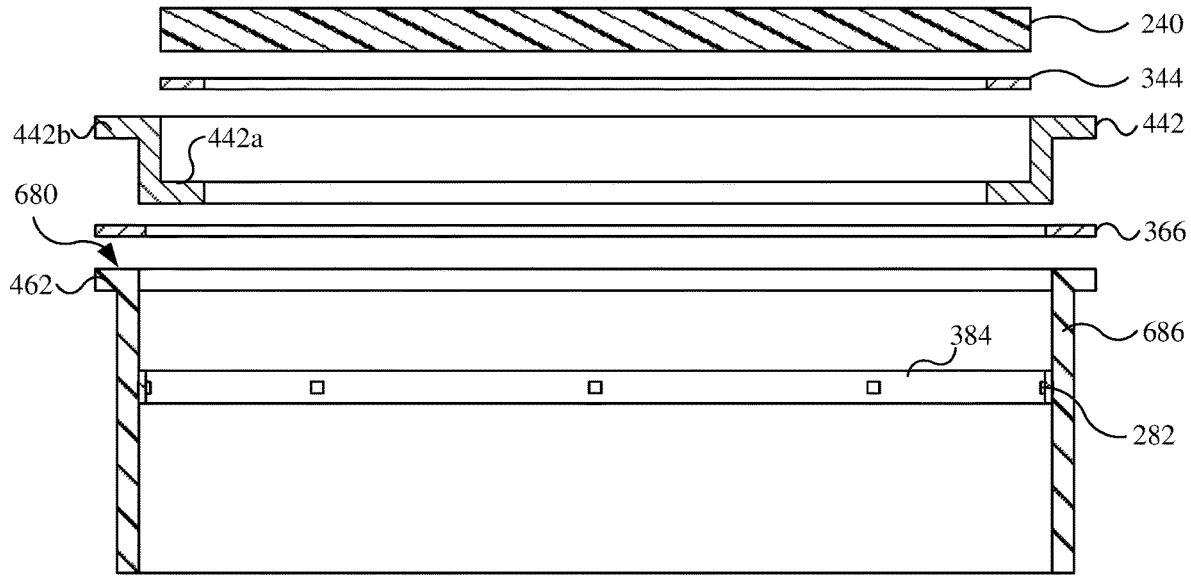
FIG. 6B is an exploded cross-sectional view of the display module of FIG. 6A.
Figure 6B:
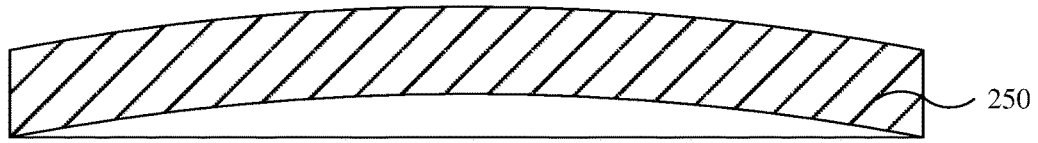

As shown in FIGS. 6A-6B, a display module 630 is a variation of the display modules 130, 430. The display module 630 includes the display 240, the lens 250, the eye sensor 270, and one of the display bezel 442 (as shown) or the display bezel 342. An illuminator 680 is a variation of the other illuminators described herein and includes a barrel stiffener 686. The barrel stiffener 686 functions as the lens barrel 260 described previously (i.e., to couple the lens 250 to the display 240), while also functioning as the stiffener 386 with the flexible circuit 384 being laminated therewith with one or fewer adhesive layers (not shown).

As is shown, the flexible circuit 384 is coupled to an inner circumferential surface of the barrel stiffener 686. As compared to the eye illuminators 280, 580 in which the flexible circuit 384 may have a planar arrangement (e.g., the bottom-most surface of the flexible base substrate 384a is planar), the flexible circuit 384 instead has a three-dimensional arrangement by being laminated to the inner circumferential surface of the barrel stiffener 686 and extending partially or wholly around the optical axis. The light-emitting diodes 282 may emit light directionally, such as primarily rearward toward the lens 250, as opposed to forward toward the display 240.

Alternatively, in the case of the barrel stiffener 686 being configured as the lens barrel 260, the barrel stiffener 686 may include an inner portion (e.g., an inner flange, similar to the inner coupling portion 368) that protrudes inward from the inner circumferential surface and onto which the flexible circuit 384 is coupled. For example, the bottom-most surface of the flexible base substrate 384a may be laminated to a rear surface of the inner portion of the barrel stiffener 686 with one or fewer adhesive layers, such as the adhesive layer 388).

The barrel stiffener 686 is coupled to the display bezel 442 (as shown, or the display bezel 342), as described previously, such as with the mechanical fasteners 364 and the seal 366 therebetween. With the display bezel 442 coupled to the display with the adhesive layer 344 and the barrel stiffener 686 being coupled to the display bezel 442 with the mechanical fasteners 364, the lens 250 is considered to be indirectly removably coupled to the display 240 indirectly by a stiffener of the illuminator 680 (i.e. by the barrel stiffener 686).

The lens 250 is coupled to a rear end of the barrel stiffener 686 in any of the manners described previously with respect to the barrels 260, 460.

The lens stack and the lens stack height of the display module 630 may be as described above for the display module 130 or the display module 430 (e.g., depending on whether the display bezel 342 or the display bezel 442 it utilized).

The illuminator stack of the display module 630 includes, and may further consist of, the adhesive layer 344, the display bezel 442, the seal 366, and the illuminator 680 (i.e., the barrel stiffener 686, the adhesive layer 388, the flexible circuit 384, and the light emitting diodes 382). The illuminator stack height of the display module 630 The illuminator stack height includes, and may further consist of, the non-overlapping perpendicular dimensions (i.e., measured relative to the display 240) of the adhesive layer 344, the display bezel 442, the seal 366, and the maximum perpendicular distance (relative to the display 240) along the barrel stiffener 686 to which the flexible circuit 384 or light-emitting diodes 382 extend. It should be noted that the flexible circuit 384 may extend further rearward than the light-emitting diodes 382 in which case the illuminator stack height is defined by the flexible circuit 384.

In each of the display modules 530, 630, mass is reduced as compared to the display modules 130, 430 by using another component as the stiffener for the flexible circuit 384 of the illuminator (e.g., the bezel stiffener 586 or the barrel stiffener 686).

As discussed above, each of the stiffener 386, the bezel stiffener 586, and the barrel stiffener 686 should be considered part of the respective eye illuminators 280, 580, 680 by being laminated to the flexible circuit 384 with one or fewer adhesive layers and/or by the manufacturer of the flexible circuit.

Furthermore, while the lens barrels 260, 460 and the barrel stiffener 686 are each coupled to the display bezel 442 (or the bezel stiffener 586) with the mechanical fasteners 364 with the seal 366 therebetween, it is contemplated that an adhesive layer (e.g., a pressure sensitive adhesive) may instead be used.

Figure 7:
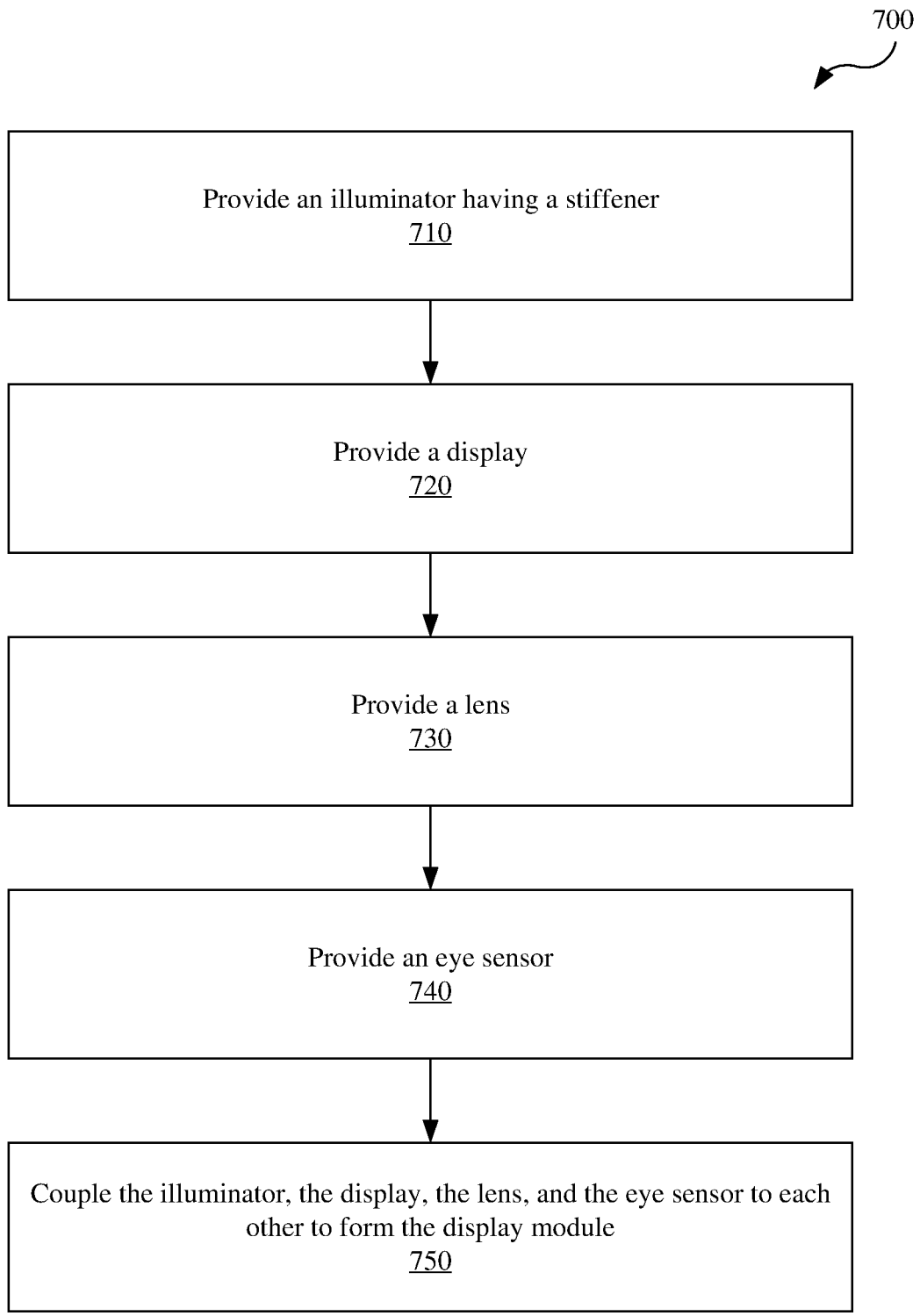
FIG. 7 is a flow chart of a method for providing a head-mounted display.

Referring to FIG. 7, a method 700 of assembling a display module generally includes providing 710 an eye illuminator, providing 720 a display, providing 730 a lens, providing an eye sensor, and coupling 750 the eye illuminator, the display, the eye sensor, and the lens to each other. Each of the providing 710, 720, 730, 740 may each be considered their own methods and be performed at different facilities and/or by different manufacturers.

The providing 710 of the illuminator (e.g., the eye illuminator 280, 580, 680) includes providing a flexible circuit (e.g., the flexible circuit 384 described previously), providing and coupling one or more-light emitting diodes (e.g., the light-emitting diodes 282) to the flexible circuit, and providing and coupling a stiffener (e.g., the stiffener 386, the bezel stiffener 586, or the barrel stiffener 686) to the flexible circuit. The flexible circuit is coupled to the stiffener, for example, by laminating a bottom-most surface of the flexible circuit (e.g., the bottom-most surface of the flexible base substrate 384a) to the stiffener with one or fewer adhesive layers (e.g., the adhesive layer 388).

The providing 720 of the display includes providing a display (e.g., the display 240 as described previously).

The providing 730 of the lens includes providing a lens (e.g., the lens 250 as described previously).

The providing 740 of the eye sensor includes providing an eye sensor (e.g., the eye sensor 270).

The coupling 750 of the illuminator, the display, and the lens to each other may be performed in various different manners.

In a first example, as with the display module 130, a display bezel (e.g., the display bezel 342) is coupled to the display with an adhesive layer (e.g., the adhesive layer 344), the lens is coupled to a barrel (e.g., the lens barrel 260) that is in turn mechanically coupled to the display bezel (e.g., with the mechanical fasteners and a seal therebetween), and the illuminator (e.g., the eye illuminator 280) is coupled to an inward coupling portion of the lens barrel 260 with an adhesive layer (e.g., the adhesive layer 389). The eye sensor (e.g., the eye sensor 270) is coupled the lens barrel. Each of the illuminator and the eye sensor are positioned in a chamber defined by the display, the lens barrel, and the lens.

In a second example, as with the display module 430, a display bezel (e.g., the display bezel 442) is coupled to the display with an adhesive layer (e.g., the adhesive layer 344), the illuminator (e.g., the eye illuminator 280) is coupled to the display bezel with an adhesive layer (e.g., the adhesive layer 388), and the lens is coupled to a barrel (e.g., the lens barrel 460) that is in turn mechanically coupled to the display bezel (e.g., with mechanical fasteners 364 and a seal 366 therebetween). The eye sensor (e.g., the eye sensor 270)

is coupled the lens barrel. Each of the illuminator and the eye sensor are positioned in a chamber defined by the display, the lens barrel, and the lens.

In each of a third example and a fourth example, the lens is coupled to display by way of the stiffener of the illuminator. In the third example, as with the display module 530, the stiffener (e.g., the bezel stiffener 586) of the illuminator (e.g., the illuminator 580) is coupled to the display 240 with an adhesive layer (e.g., the adhesive layer 344), and the lens is coupled to the lens barrel (e.g., the lens barrel 460) that is in turn mechanically coupled to the stiffener (e.g., with the mechanical fasteners 364 and the seal 366 therebetween).

In the fourth example, as with the display module 630, a display bezel (e.g., the display bezel 442) of the illuminator (e.g., the illuminator 680) lens is coupled to the display with an adhesive layer (e.g., the adhesive layer 344), and the lens is coupled to the stiffener (e.g., the barrel stiffener 686) that is in turn mechanically coupled to the display bezel (e.g., with the mechanical fasteners 364 and the seal 366 therebetween).

A physical environment refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell.

In contrast, a computer-generated reality (CGR) environment refers to a wholly or partially simulated environment that people sense and/or interact with via an electronic system. In CGR, a subset of a person's physical motions, or representations thereof, are tracked, and, in response, one or more characteristics of one or more virtual objects simulated in the CGR environment are adjusted in a manner that comports with at least one law of physics. For example, a CGR system may detect a person's head turning and, in response, adjust graphical content and an acoustic field presented to the person in a manner similar to how such views and sounds would change in a physical environment. In some situations (e.g., for accessibility reasons), adjustments to characteristic(s) of virtual object(s) in a CGR environment may be made in response to representations of physical motions (e.g., vocal commands).

A person may sense and/or interact with a CGR object using any one of their senses, including sight, sound, touch, taste, and smell. For example, a person may sense and/or interact with audio objects that create 3D or spatial audio environment that provides the perception of point audio sources in 3D space. In another example, audio objects may enable audio transparency, which selectively incorporates ambient sounds from the physical environment with or without computer-generated audio. In some CGR environments, a person may sense and/or interact only with audio objects.

Examples of CGR include virtual reality and mixed reality.

A virtual reality (VR) environment refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end.

In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationery with respect to the physical ground.

Examples of mixed realities include augmented reality and augmented virtuality.

An augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment.

An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

An augmented virtuality (AV) environment refers to a simulated environment in which a virtual or computer-generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

There are many different types of electronic systems that enable a person to sense and/or interact with various CGR environments. Examples include head mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mounted system may have one or more speaker(s) and an integrated opaque display. Alternatively, a head mounted system may be configured to accept an external opaque display (e.g., a smartphone). The head mounted system may incorporate one or more imaging sensors to capture images or video of the physical environment, and/or one or more microphones to capture audio of the physical environment. Rather than an opaque display, a head mounted system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

As described above, one aspect of the present technology is the gathering and use of data available from various sources, for example, to monitor or identify the user. The present disclosure contemplates that in some instances, this gathered data may include personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to monitor or identify the user. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of monitoring or identifying the user, the present technology can be configured to allow users to select to "opt in" or "opt out" of participation in the collection of personal information data during registration for services or anytime thereafter. In another example, users can select not to be monitored or identified. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, user monitoring and/or user identification may be performed based on non-personal information data or a bare minimum amount of personal information, such as the content being requested by the device associated with a user, other non-personal information available, or publicly available information.

What is claimed is:

1. A head-mounted display comprising:
   a housing;
   two display modules coupled to the housing, each of the two display modules comprising:
     a display for outputting light that forms graphical content;
     a lens for refracting the light output by the display;
     an eye illuminator having a light-emitting diode, a flexible circuit, and a stiffener, wherein the light-emitting diode is coupled to an upper surface of the flexible circuit, and the stiffener is a structural component that is laminated to a bottom surface of the flexible circuit with one or fewer layers of adhesive, the lens being removably coupled to the display indirectly by the stiffener; and
   a head support coupled to the housing for supporting the housing on a head of a user with the two display modules positioned to provide the graphical content to eyes of the user.

2. The head-mounted display according to claim 1, wherein for each of the display modules, the flexible circuit includes a flexible base substrate and a conductive trace laminated to an upper surface of the flexible base substrate, and a bottom-most surface of the flexible base substrate is coupled to a rear surface of the stiffener with a single layer of adhesive therebetween to laminate the flexible circuit to the stiffener.

3. The head-mounted display according to claim 1, wherein each of the display modules further includes a lens barrel to which the lens is coupled, and the lens barrel is removably coupled to the stiffener with a mechanical fastener to removably couple the lens to the display.

4. The head-mounted display according to claim 3, wherein for each of the display modules, the stiffener is a bezel stiffener that is coupled to the display with an adhesive layer coupled to a rear surface of the display and a forward surface of the bezel stiffener.

5. The head-mounted display according to claim 1, wherein for each of the display modules, the stiffener is a barrel stiffener to which the lens is coupled.

6. The head-mounted display according to claim 5, wherein each of the display modules further includes a display bezel that is coupled to the display with an adhesive layer, and the barrel stiffener is removably coupleable to the display bezel with a mechanical fastener to removably couple the lens to the display.

7. The head-mounted display according to claim 1, further comprising an eye sensor, wherein a chamber is defined between the display and the lens, and the eye sensor and the eye illuminator are positioned within the chamber.

8. A display module for a head-mounted display comprising:
   a display for outputting light that forms graphical content;
   a lens for refracting the light output by the display; and
   an eye illuminator having a light-emitting diode, a flexible circuit to which the light-emitting diode is coupled, and a stiffener laminated to the flexible circuit with one or fewer layers of adhesive, the lens being removably coupled to the display indirectly by the stiffener.

9. The display module according to claim 8, wherein the flexible circuit includes a flexible base substrate and a conductive trace laminated to an upper surface thereof, and a bottom-most surface of the flexible base substrate is laminated to a forward surface of the stiffener with a single layer of adhesive therebetween.

10. The display module according to claim 8, further comprising a lens barrel to which the lens is coupled, wherein the lens barrel is a tubular structure that circumscribes an optical axis of the display module and is removably coupled to the stiffener with a mechanical fastener to removably couple the lens to the display.

11. The display module according to claim 10, wherein the stiffener is a bezel stiffener that is coupled to the display with an adhesive layer that is coupled to an outer periphery of a rear surface of the display and to a forward surface of the lens barrel.

12. The display module according to claim 8, wherein the stiffener is a barrel stiffener to which the lens is coupled, the barrel stiffener being a tubular structure that circumscribes an optical axis of the display module.

13. The head-mounted display according to claim 12, further comprising a display bezel having an inner coupling portion and an outer coupling portion, wherein the inner coupling portion is coupled to an outer periphery of a forward surface of the display with an adhesive layer, the outer coupling portion extends radially outward from the inner coupling portion and the display, and the barrel stiffener is removably coupleable to the outer coupling portion of the display bezel with a mechanical fastener to removably couple the lens to the display.

14. The display module according to claim 8, further comprising an eye sensor, wherein a chamber is defined between the display and the lens, and the eye sensor and the eye illuminator are positioned within the chamber.

15. A display module for a head-mounted display, the display module comprising:
   a display that outputs light as graphical content;
   a lens removably coupled to the display and that refracts the light output by the display;
   an eye sensor; and
   an eye illuminator for illuminating an eye of a user of the head-mounted display for the eye sensor to observe the eye, the eye illuminator including a flexible circuit, a light-emitting diode coupled to an upper surface of the flexible circuit, and a stiffener that is a structural component that is coupled to a bottom-most surface of the flexible circuit with one or fewer layers of adhesive, wherein the display module has a lens stack that extends from a rear surface of the display to the lens and that includes the stiffener.

16. The display module according to claim 15, further comprising a lens barrel by which the lens is coupled to the display, wherein the stiffener is a bezel stiffener that is coupled to a rear surface of the display with an adhesive layer, the lens barrel is coupled to the bezel stiffener to couple the lens to the display, and the lens stack includes the adhesive layer, the bezel stiffener, the lens barrel, and the lens.

17. The display module according to claim 16, wherein the bezel stiffener includes an inner coupling portion that is coupled to the display with the adhesive layer and an outer coupling portion that is coupled to the lens barrel with a mechanical fastener and a seal therebetween, wherein the lens stack includes the adhesive layer, the inner coupling portion of the bezel stiffener, the seal, the lens barrel, and the lens.

18. The display module according to claim 16, wherein the display module has an illuminator stack extending from the rear surface of the display to the light-emitting diode, the illuminator stack including the adhesive layer, the stiffener, and the light-emitting diode.

19. The display module according to claim 18, wherein the illuminator stack consists of the adhesive layer, an inner coupling portion of the stiffener, the one or fewer layers of adhesive by which the stiffener is coupled to the flexible circuit, the flexible circuit, and the light-emitting diode.

20. The display module according to claim 15, further comprising a display bezel that is coupled to a rear surface of the display with an adhesive layer, wherein the stiffener is a barrel stiffener that is coupled to the display bezel with a seal therebetween and by which the lens is coupled to the display, and wherein the lens stack includes the adhesive layer, the seal, the barrel stiffener, and the lens.

* * * * *